July 9, 1957
S. ADLER ET AL
2,798,992
FINE AND COARSE CONTROL SERVO SYSTEM
Filed Feb. 4, 1955
2 Sheets-Sheet 2
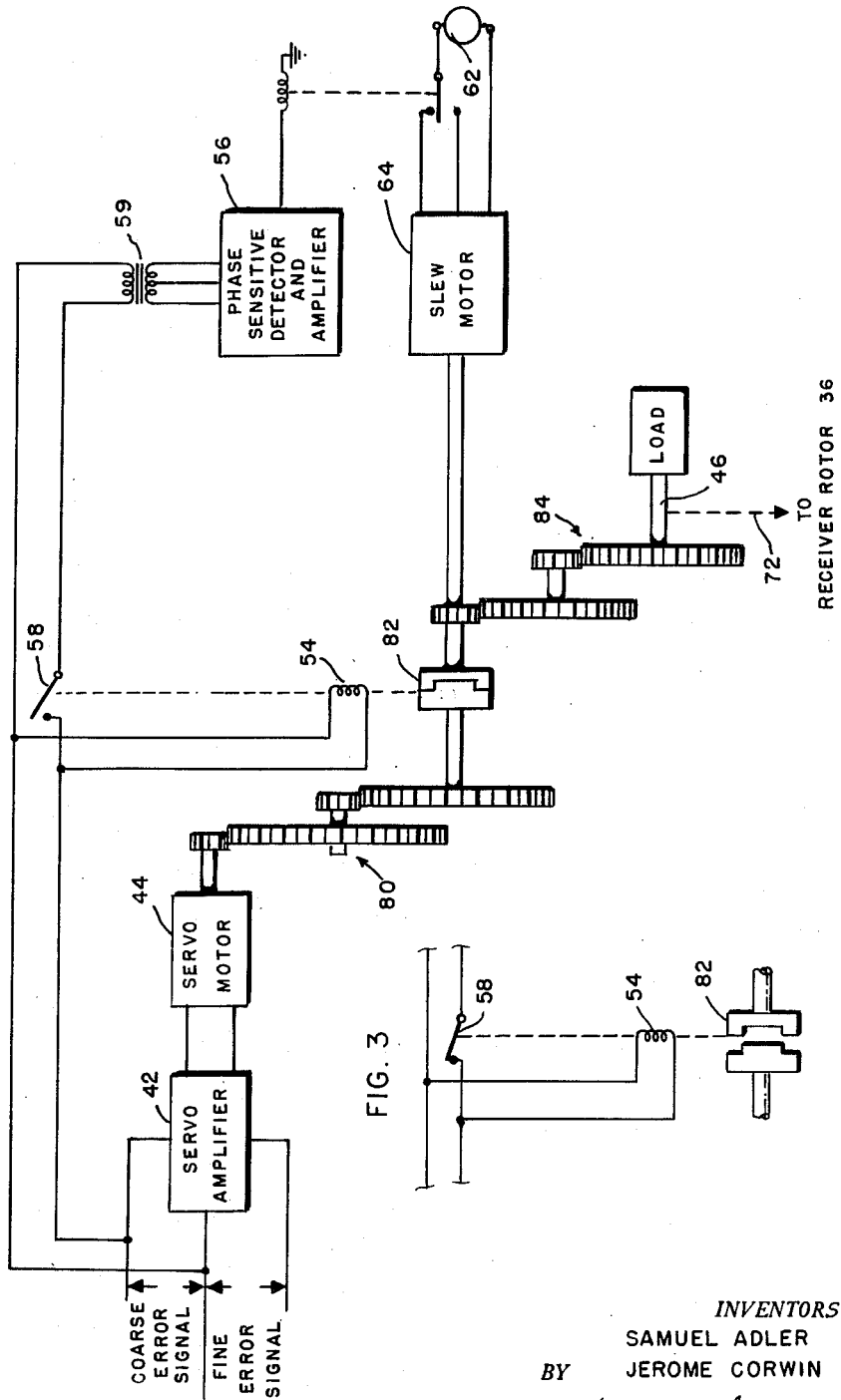
INVENTORS.
SAMUEL ADLER
JEROME CORWIN
BY
Harry M. Saragovitz
ATTORNEY

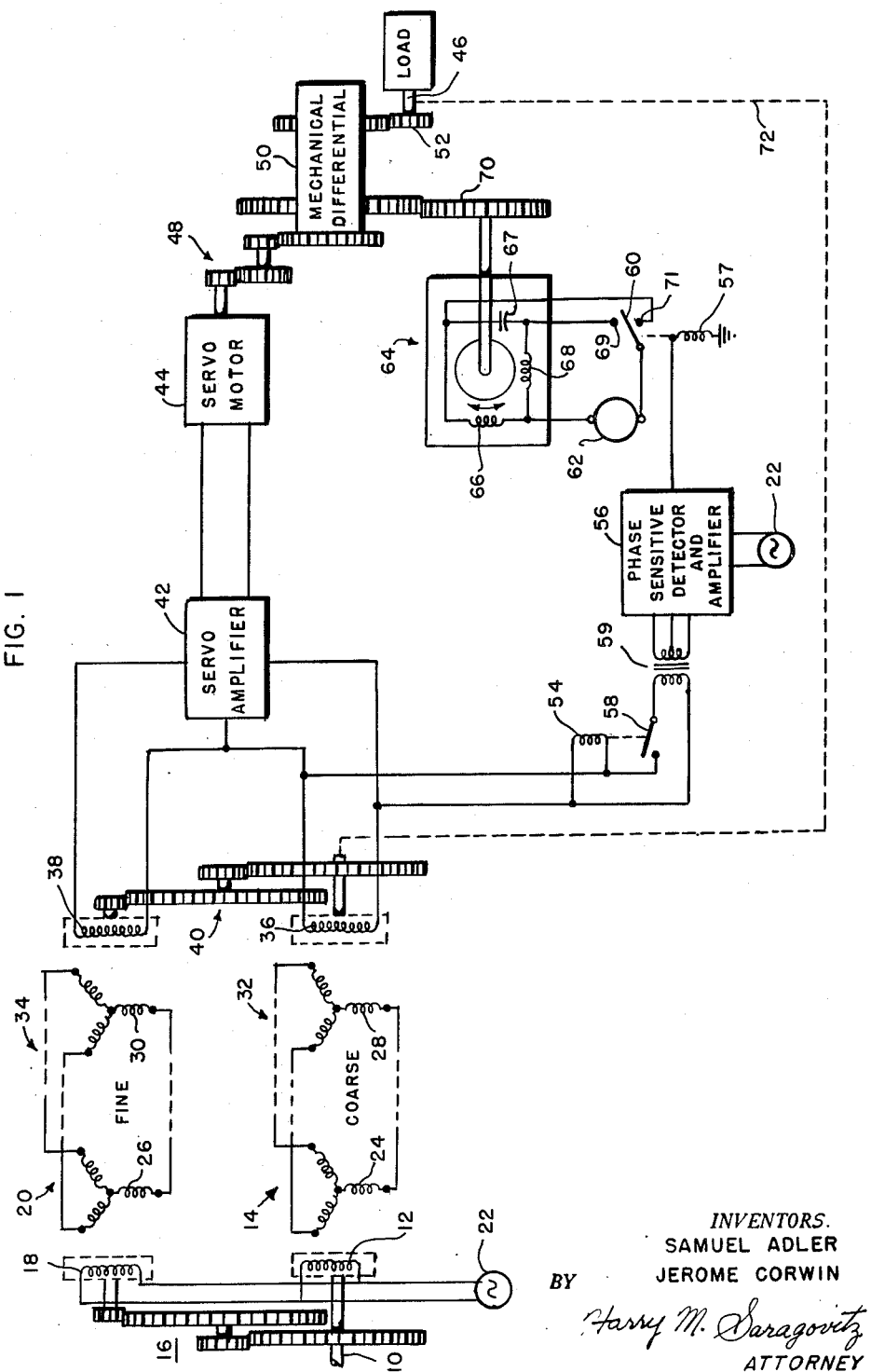

United States Patent Office 2,798,992
Patented July 9, 1957

2,798,992

FINE AND COARSE CONTROL SERVO SYSTEM

Samuel Adler, Asbury Park, and Jerome Corwin, Long Branch, N. J., assignors to the United States of America as represented by the Secretary of the Army Application February 4, 1955, Serial No. 486,299

9 Claims. (Cl. 318—19)

(Granted under Title 35, U. S. Code (1952), sec. 266)

The invention described herein may be manufactured and used by or for the Government for governmental purposes without the payment of any royalty thereon.

This invention relates to a servo drive system and more particularly to a fine and coarse error signal system.

Fine and coarse error signal systems are ordinarily employed in servomotor systems to provide a close and quite accurate control over the servomotor so that the load shaft or positionable object driven thereby will follow an input shaft or reference member with extremely small lag or lead therebtween. Ordinarily, the fine and coarse error systems respectively include a signal transmitter and a signal receiver. The transmitter of the coarse system may be directly connected with the data input or reference member so that the rotor thereof rotates in 1:1 ratio with respect thereto, while the rotor of the fine transmitter is rotated in some ratio, such, for example, as 36:1 or any other desired ratio with respect to the input shaft. Therefore the coarse signal voltage derived from the coarse error system will vary directly in amplitude with rotation of the input shaft, while the fine error voltage derived from the fine system will vary in amplitude in the adopted ratio with respect to rotation of the input shaft. These signal voltages are usually applied to an amplifier which energizes a suitable servomotor, which in turn drives the shaft of a load in a direction to zero the error voltage.

In tracking more than one target, it is often necessary that the servomotor perform both the tracking function and the slewing function. The term "slewing" relates to the rapid swing or movement in a prescribed direction of a director or aiming device when picking up a target which is to be tracked. Due to the fact that there is usually a great variation between slewing and tracking speeds, such a system would necessarily require a relatively high servo amplifier output and a heavy duty servomotor rotor with their concomitant deleterious effects in tracking. The practicality of such a system in further limited by the maximum speed that may be attained by the servomotor for any given gear ratio. Moreover, it is desirable that the servomotor operate on the linear portion of the speed-torque curve so that, in effect, the torque will be proportional to the error signal. If the same servomotor is to be used for both tracking and slewing action, then it becomes necessary to operate also over the non-linear portion of the speed-torque curve so that for a certain range of error voltages the output torque will not be proportional to the error voltages and hence inaccuracies may readily occur in addition to undesired variation in servo-loop again.

It is therefore an object of the present invention to provide an improved servo drive system having unlimited slewing speed and a relatively slow tracking speed.

It is another object of the present invention to provide an improved servo drive system utilizing separate drive motors for slewing and tracking.

It is still another object of the present invention to provide a servo drive system having a combined high speed slew response and low speed tracking response without the need of a heavy duty servomotor and additional high powered amplifiers with their inherent complicated circuitry.

In the description below, the term "slew motor" relates to the drive motor which controls the slewing function.

In accordance with the present invention there is provided a servo system having means for generating fine and coarse error voltage signals corresponding to the angular displacement between a prescribed load and a reference position and including means for amplifying said signals. A servomotor is provided which is responsive to the output of the amplifying means for positioning the load in accordance with the error signals. Also included are a slew motor responsive only to coarse error signals having amplitude levels greater than a predetermined value corresponding to a given angular displacement between the load and the reference position, and means drivenly connected between said load and the shafts of the servomotor and the slew motor whereby the load is positioned by the shaft outputs of the servomotor and the slew motor in a direction such that the error voltages are reduced to zero.

For a better understanding of the invention, together with other and further objects thereof, reference is had to the following description taken in connection with the accompanying drawing in which:

Figure 1 schematically represents a preferred embodiment of the invention;

Figure 2 represents a second embodiment of the invention; and

Fig. 3 shows one operating condition of the magnetic clutch shown in Fig. 2.

Referring now to Figure 1, 10 is the input shaft with which a reference member may be connected and to which the rotor 12 of the transmitter 14 in the coarse error signal system is directly coupled so that the shaft and rotor rotate together. The input shaft 10 is also coupled through a gear train 16 with the rotor 18 of a transmitter 20 which is the transmitter in the fine error signal system. The gear train 16 is assumed to drive the rotor 18 in a ratio of 36:1 with respect to the input shaft of rotor 12 of the coarse transmitter. The rotors of the transmitters 14 and 20 are connected across a suitable alternating current source indicated generally at 22. The stator windings 24 and 26 respectively of the transmitters 14 and 20 comprise polycircuit windings which are connected in polycircuit relation with the stators 28 and 30 of signal receivers 32 and 34. The respective rotors 36 and 38 of signal receivers 32 and 34 are connected by means of gear train 40 to provide a 36:1 ratio therebetween as exists between the fine and coarse transmitter rotors. Selsyn or autoselsyn transmitters and receivers may be employed as well as other types of transmitters and receivers. The output of rotors 36 and 38 are applied to a servo amplifier 42 which is of conventional design and includes means whereby it is controlled by the coarse error signals until the error signal falls below a prescribed value at which time the amplifier is controlled only by the fine error signal. The selsyn system and servo amplifier hereinabove described are well known in the art and do not constitute any part of my invention. The output of servo amplifier 42 is applied to servomotor 44 which, in turn, is operatively connected to drive a load shaft 46 through gear train 48 having a relatively high stepdown gear ratio, through mechanical differential 50, and through gear train 52.

The output of coarse error signal receiver rotor 36 is connected across a relay 54 which is so constructed that it is energized only when the coarse signal error voltage is greater than a given magnitude. The output of rotor 36 is also applied to a conventional phase sensitive detector and amplifier 56 through relay switch 58 and transformer 59. Also applied to phase sensitive amplifier 56 is the reference voltage 22 which is applied to transmitter rotor windings 12 and 18. As shown, the output of phase sensitive amplifier 56 is applied to an output switching relay 57 which is operatively associated with switch 60 connected to one terminal of the energizing source 62 for the field windings of a high speed slew motor 64. Slew motor 64 may be any conventional reversible motor and is herein shown as a split-phase capacitor type motor with the junction of both field windings 66 and 68 connected to the other terminal of energizing source 62 and a capacitor 67 connected between the other terminals of the field windings as shown. Capacitor 67 is also connected across relay contact terminals 69 and 71 so that the direction of rotation of motor 64 may be controlled by relay switch 60. With relay switch 60 connected to contact 69 slew motor 64 will be rotatably driven in one direction and with switch 60 connected to contact 71, slew motor 64 will be rotatably driven in the opposite direction. The output of phase sensitive amplifier 56 is so arranged that the direction of rotation of slew motor 64 and servomotor 44 are in accord with the phase sense of the signals derived from the coarse and fine data transmission system. For example, when the coarse error signal is in phase with reference voltage 22, relay 57 may be energized thereby causing switch 60 to connect with contact 69 and when the coarse error signal is in the opposite phase sense, polarized relay 57 is oppositely energized so that switch 60 connects with contact 71. It is to be understood, of course, that the shafts of servomotor 44 and slew motor 64 always drive load shaft 46 in the same direction of rotation. The shaft output from slew motor 64 is operatively connected to drive load shaft 46 through gear train 70 having a relatively low stepdown gear ratio, through mechanical differential 50 and gear train 52. Load shaft 46 is operatively connected to drive the rotors 36 and 38 through suitable gearing and shafting indicated generally at 72. This connection provides for the zeroing of the control signal when the load or positionable object driven by the combined outputs of slew motor 64 and servomotor 44 is aligned with the position of the reference member associated with shaft 10.

In operation, whenever the command signal at shaft 10 causes a coarse error signal to be developed which is greater than the chosen magnitude, relay 54 is energized thereby closing switch 58 and consequently the coarse error signal is applied to phase sensitive detector 56. The output of phase sensitive amplifier 56 will determine the position of switch 60 which in turn will control the direction of rotation of the slewing motor 64 as hereinabove described. The high speed slew motor adds its performance to that of the positional following servomotor 44 through mechanical differential 50 to rotate shaft 10 in a direction to zero the error voltage.

Figure 2 illustrates another embodiment of my invention wherein the mechanical differential is replaced by a magnetic clutch arrangement so that the slewing action is separate and distinct from the positional tracking action of the servo. Like elements are designated by like numerals.

Referring now to Figure 2, the shaft of output of servomotor 44 is operatively connected to load shaft 46 through gear train 80, magnetically engaged clutch 82 and gear train 84. For position tracking only, that is, when the coarse error signal is below the chosen magnitude and slew motor 64 is unenergized, clutch 82 is in the engaged position so that shaft load 46 is driven only in accordance with the output from the servomotor 44. For slewing action, relay 54 is energized and is adapted to actuate switch 58 and simultaneously cause clutch 82 to become disengaged as shown in Fig. 3 so that load shaft 46 is driven only by the shaft output of slew motor 64 which is actuated to rotate in the proper direction by the output of phase sensitive detector and amplifier 56 as hereinabove described.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a servo system having means for generating fine and coarse error voltage signals corresponding to the angular displacement between a prescribed load and a reference position and including means for amplifying said signals, a servomotor responsive to the output of said amplifying means for positioning said load in accordance with the magnitude and polarity of said error signals, a slew motor responsive only to coarse error signals having amplitude levels greater than a predetermined value corresponding to a given angular displacement between said load and said reference position, and means drivenly connected between said load and the shafts of said servomotor and said slew motor whereby said load is positioned by the combined outputs of said servomotor and said slew motor in a direction to reduce said error voltages to zero.

2. The system in accordance with claim 1 wherein said last mentioned means comprises a mechanical differential having a driving output means operatively associated with said load and two discrete driven input means operatively associated with the shafts of said servo and slew motors respectively.

3. In a servo system having means for generating fine and coarse error voltage signals having amplitudes corresponding to the angular displacement between a prescribed load and a reference position and including means for amplifying said signals, a servomotor responsive to the output of said amplifying means, a slew motor, means for energizing said slew motor only when the coarse error signal amplitude level is greater than a given value corresponding to a given angular displacement between said load and said reference position, means in circuit with said slew motor for controlling the direction of rotation of the shaft thereof in accordance with the phase sense of said given coarse error voltage signal with respect to a prescribed reference voltage, and means drivenly connected between said load and the shafts of said servomotor and said slew motor whereby said load is positioned by the combined outputs of said servomotor and said slew motor in a direction to reduce said error voltages to zero.

4. The system in accordance with claim 3 wherein the means for controlling the direction of rotation of said slew motor comprises a phase detector having its input responsive to said given coarse error signal and said reference voltage, a relay responsive to the output of said detector, and switch means operatively associated with said relay and in circuit with the energizing source for said slew motor.

5. In a servo system having means for generating fine and coarse error signals corresponding to the angular displacement between a prescribed load and a reference position and including means for amplifying said error signals, a mechanical differential having an output gear drive and two gear driven inputs, said load being drivenly connected to said output gear drive, a servomotor responsive to the output of said amplifying means and having a shaft drivenly connected to one of said input gear drives whereby said load is positioned in accordance with said error voltages and a high-speed slew motor responsive only to coarse error signals having amplitude levels greater than a predetermined value and drivenly connected to the other of said gear driven inputs whereby said load is slewed in coincidence with said coarse error voltage.

6. In a servo system having means for generating error voltage signals corresponding to the angular displacement between a prescribed load and a reference position and including means for amplifying said signals, a servomotor responsive to the output of said amplifying means, a slew motor responsive only to given error signal voltages having amplitude levels greater than a predetermined value corresponding to a given angular displacement between said load and said reference position and means drivenly connected to said load and coupled to the shafts of said servomotor and slew motor whereby said load is positioned only by the output of said servomotor when the error signals are smaller in amplitude than said predetermined value and positioned only by the output of said slew motor when the error signals are greater than said predetermined value, said load being positioned by both outputs in a direction to reduce said error voltages to zero.

7. The system in accordance with claim 6 wherein said last mentioned means comprises a magnetic clutch having one plate thereof drivenly connected to the shaft of said servomotor and the other plate thereof connected directly to the shaft of said slew motor and drivenly connected to said load.

8. The system in accordance with claim 7 and further including a relay responsive to said given error signal voltage for actuating said clutch.

9. The system in accordance with claim 6 and further including means for controlling the direction of rotation of the shaft of said slew motor in accordance with the polarity of said error signals with respect to a reference voltage whereby the outputs of said servomotor and said slew motor drive said load in the same direction of rotation.

No references cited.